(12) United States Patent
Launiere et al.

(10) Patent No.: US 11,933,734 B2
(45) Date of Patent: Mar. 19, 2024

(54) OPEN APERTURE FLOW CELLS FOR ON-LINE OPTICAL ANALYSIS OF PROCESS FLUIDS

(71) Applicant: UCHICAGO ARGONNE, LLC, Chicago, IL (US)

(72) Inventors: Cari A. Launiere, Bolingbrook, IL (US); Nathaniel C. Hoyt, Clarendon Hills, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 121 days.

(21) Appl. No.: 17/351,010

(22) Filed: Jun. 17, 2021

(65) Prior Publication Data
US 2022/0404287 A1    Dec. 22, 2022

(51) Int. Cl.
| | |
|---|---|
| G01N 21/85 | (2006.01) |
| G01N 1/38 | (2006.01) |
| G01N 21/31 | (2006.01) |

(52) U.S. Cl.
CPC .............. *G01N 21/85* (2013.01); *G01N 1/38* (2013.01); *G01N 21/31* (2013.01)

(58) Field of Classification Search
CPC ............................... G01N 21/05; G01N 21/85
See application file for complete search history.

(56) References Cited

U.S. PATENT DOCUMENTS

| | | | |
|---|---|---|---|
| 3,475,950 A | 11/1969 | Ferrin | |
| 4,206,650 A * | 6/1980 | Berber | G01N 35/1095 96/417 |
| 5,034,194 A | 7/1991 | Miller et al. | |
| 5,404,761 A | 4/1995 | Fellay et al. | |
| 5,413,005 A | 5/1995 | Gray | |
| 10,416,045 B2 | 9/2019 | Launiere et al. | |
| 10,438,705 B2 | 10/2019 | Cheatham et al. | |
| 2004/0058488 A1* | 3/2004 | Arno | G01N 21/05 438/200 |

(Continued)

FOREIGN PATENT DOCUMENTS

| | | |
|---|---|---|
| JP | 3707301 B2 | 10/2005 |
| WO | WO-93/02346 A1 | 2/1993 |
| WO | WO-2015/164620 A1 | 10/2015 |

OTHER PUBLICATIONS

Abate, et al., "Glass coating for PDMS microfluidic channels by sol-gel methods," Lab on a Chip 8(4), pp. 516-518 (2008).

(Continued)

*Primary Examiner* — Hina F Ayub
(74) *Attorney, Agent, or Firm* — Foley & Lardner LLP

(57) ABSTRACT

A flow cell system includes a vessel and a fluid located in the vessel. A fluid surface of the fluid can be vented to a first gas pressure. The fluid surface can have a first cross-sectional area. The flow cell system includes a conduit in fluid communication with the vessel and positioned downstream of the vessel. The conduit can have a region that includes one or more orifices and has a second cross-sectional area. The second cross-sectional area can be less than the first cross-sectional area. The one or more orifices can be vented to a second gas pressure. The second gas pressure can be equal to or greater than the first gas pressure. Methods for analyzing a process fluid can include characterizing the fluid in the conduit.

21 Claims, 9 Drawing Sheets

(56) References Cited

U.S. PATENT DOCUMENTS

| | | | |
|---|---|---|---|
| 2007/0153282 A1* | 7/2007 | Zubkov | G01N 21/0303 |
| | | | 356/436 |
| 2007/0219379 A1 | 9/2007 | Itoh et al. | |
| 2013/0233093 A1 | 9/2013 | Pohl et al. | |
| 2016/0329198 A1 | 11/2016 | Badu-Tawiah et al. | |
| 2017/0045423 A1 | 2/2017 | Launiere et al. | |
| 2017/0184492 A1* | 6/2017 | Hong | G01N 33/004 |
| 2021/0299660 A1* | 9/2021 | Denomme | G01N 33/54386 |
| 2021/0405001 A1* | 12/2021 | Weida | G01N 30/78 |
| 2022/0205925 A1* | 6/2022 | Belz | G01N 21/05 |

OTHER PUBLICATIONS

Anheier, et al., "Technical Readiness and Gaps Analysis of Commercial Optical Materials and Measurement Systems for Advanced Small Modular Reactors," Pacific Northwest National Laboratory Report No. PNNL-22622, 302 pages (2013).

Bouse, "Some Screw Conveyor Parameters That Affect Capacity and Seed Damage," Oklahoma State University Thesis, 142 pages (1963).

Cabalin, et al., "Flow-injection analysis and liquid chromatography: surface-enhanced Raman spectrometry detection by using a windowless flow cell," Analytica Chimica Acta 318(2), pp. 203-210 (1996).

Coble, et al., "Review of Candidate Techniques for Material Accountancy Measurements in Electrochemical Separations Facilities," Nuclear Technology 206(12), pp. 1803-1826 (2019).

Guet & Ooms, "Fluid Mechanical Aspects of the Gas-Lift Technique," Annual Review of Fluid Mechanics 38, pp. 225-249 (2006).

Hahn & Omenetto, "Laser-Induced Breakdown Spectroscopy (LIBS), Part II: Review of Instrumental and Methodological Approaches to Material Analysis and Applications to Different Fields," Applied Spectroscopy 66(4), pp. 347-419 (2012).

Hudson, et al., "Applications of Laser-Induced Breakdown Spectroscopy (LIBS) in Molten Metal Processing," Metallurgical and Materials Transactions B 48, pp. 2731-2742 (2017).

Jeromen, et al., "Laser Droplet Generation from a Metal Foil," Physics Procedia 56, pp. 720-729 (2014).

Luo, et al., "Fabrication of Solder Balls via Electromagnetic Jetting," 2018 IEEE 13th Annual International Conference on Nano/Micro Engineered and Molecular Systems (NEMS), pp. 519-522 (2018).

Luo, et al., "Printing solder droplets for micro devices packages using pneumatic drop-on-demand (DOD) technique," Journal of Materials Processing Technology 212(10), pp. 2066-2073 (2012).

Morrison & Bateman, "Transfer and Storage of Molten Salt for the Pyroprocessing of Used Nuclear Fuel," Journal of Nuclear Engineering and Radiation Science 3(1):011001, 8 pages (2017).

Mullen, et al., "Transfer characteristics of a lithium chloride-potassium chloride molten salt," Nuclear Engineering and Technology 49(8), pp. 1727-1732 (2017).

Quist, "A Windowless Cell for Laser-Raman Spectroscopy of Molten Fluorides," Applied Spectroscopy 25, pp. 80-82 (1971).

Tauber, et al., "Flowing liquid sample jet for resonance Raman and ultrafast optical spectroscopy," Review of Scientific Instruments 74(11), pp. 4958-4960 (2003).

Toth, et al., "Diamond-windowed cell for spectrophotometry of molten fluoride salts," Analytical Chemistry 41(4), pp. 683-685 (1969).

Xu & Yu, "Prediction of the pumping capacity for reverse-flow diverter pumps," Chemical Engineering Research and Design 92(7), pp. 1219-1226 (2014).

Yang, et al., "In situ SEM and ToF-SIMS analysis of IgG conjugated gold nanoparticles at aqueous surfaces," Surface and Interface Analysis 46(4), pp. 224-228 (2014).

Yang, et al., "Three-dimensional CFD simulations to study the effect of impeller geometry on internal flow field in ADS upward spiral flow target," Journal of Nuclear Science and Technology 55(12), pp. 1381-1392 (2018).

Young, "Windowless Spectrophotometric Cell for Use with Corrosive Liquids," Analytical Chemistry 36(2), pp. 390-392 (1964).

* cited by examiner

OPEN APERTURE FLOW CELLS FOR ON-LINE OPTICAL ANALYSIS OF PROCESS FLUIDS

GOVERNMENT RIGHTS

This invention was made with government support under Contract No. BCP-NT-2018-38 and AF5835000 awarded by the United States Department of Energy to UChicago Argonne, LLC, operator of Argonne National Laboratory. The government has certain rights in the invention.

TECHNICAL FIELD

The present application relates generally to the field of monitoring chemical processes, and more specifically to systems and methods for optical analysis of process fluids.

BACKGROUND

The analysis of process fluid constituents (e.g., components, contaminants, entrained gases and solids, etc.) can provide information on the properties or features of the fluid that can be useful for process monitoring, process control, process development, and basic science applications. Industrial processes can have considerations such as extreme temperatures, radiation, highly corrosive fluids, or highly abrasive fluids. This can limit the usefulness of conventional monitoring technology, such as on-line optical analysis systems. Molten salts and mineral slurries are particularly problematic for conventional optical window materials, which can lose optical clarity due to clouding or material deposition after a few hours in molten salts and after a few weeks in mineral slurries.

SUMMARY

The systems and methods of the present disclosure can provide a flow cell system. The flow cell system can include one or more flow cells. The flow cell can include one or more orifices (e.g., apertures, holes, etc.) to facilitate windowless optical access and enable on-line optical analysis of flowing process fluids in a sampling loop. This can address the issue of optical window material compatibility by eliminating the optical window material from the flow cell. The one or more orifices can provide windowless optical access to fluid flowing in the flow cell. A spectroscopic system can be integrated with the windowless optical cell to provide continuous, on-line monitoring of various parameters of the fluid. For example, the spectroscopic system can monitor the composition of molten salts or other process fluids that are not compatible with conventional optical window materials. One or more spectroscopic systems can be integrated with the flow cell system.

Additionally, the systems and methods of the present disclosure can address problems associated with performing on-line optical analysis on high temperature fluids, high radiation fluids, highly corrosive fluids, highly abrasive fluids, or scaling fluids. These fluids can damage or cloud conventional optical window materials. The systems and methods of the present disclosure allow for the implementation of larger apertures for windowless optical cells for the analysis of flowing liquids compared to conventional windowless optical cells which rely on surface tension to prevent fluid from leaking from the orifice. High temperature systems can have applications in molten salt or molten metal processing. Room temperature systems can have applications in minerals processing. The systems and methods of the present disclosure can allow industrial processes to take advantage of high-throughput data collection, machine learning, and digital-twin technology to optimize process efficiency through near real-time feedback and control. Near real-time analysis can improve process control, process efficiency, product quality and material accountancy. This has applications in molten salt reactors, pyroprocessing, solar energy and heat storage (e.g., concentrating solar power, solar energy storage), electrodeposition, electroforming, minerals processing (e.g., mineral slurries), electrometallurgy, and oil and gas. Molten salt applications can include monitoring of chemical composition or isotopic composition or other fluid properties for process control or material accountancy and the monitoring of corrosion products or particles as part of a capital asset preservation program.

At least one aspect of the present disclosure is directed to a flow cell system. The flow cell system can include a vessel and a fluid located in the vessel. A fluid surface of the fluid can be vented to a first gas pressure (e.g., first pressure). The fluid surface can have a first cross-sectional area. The flow cell system can include a conduit in fluid communication with the vessel and positioned downstream of the vessel. The conduit can have a region with a second cross-sectional area that includes one or more orifices. The second cross-sectional area can be less than the first cross-sectional area. The one or more orifices can be vented a second gas pressure (e.g., second pressure). The second gas pressure can be equal to or greater than the first gas pressure.

Another aspect of the present disclosure is directed to a method for analyzing a process fluid. The method can include providing a vessel containing a fluid. The method can include venting a fluid surface of the fluid to a first gas pressure. The fluid surface can have a first cross-sectional area. The method can include flowing the fluid from the vessel to a conduit positioned downstream from the vessel. The conduit can have a region with a second cross-sectional area that is less than the first cross-sectional area. The conduit can include one or more orifices. The method can include venting the one or more orifices to the first gas pressure or to a second gas pressure. The second gas pressure can be greater than the first gas pressure. The method can include characterizing the fluid in the conduit.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
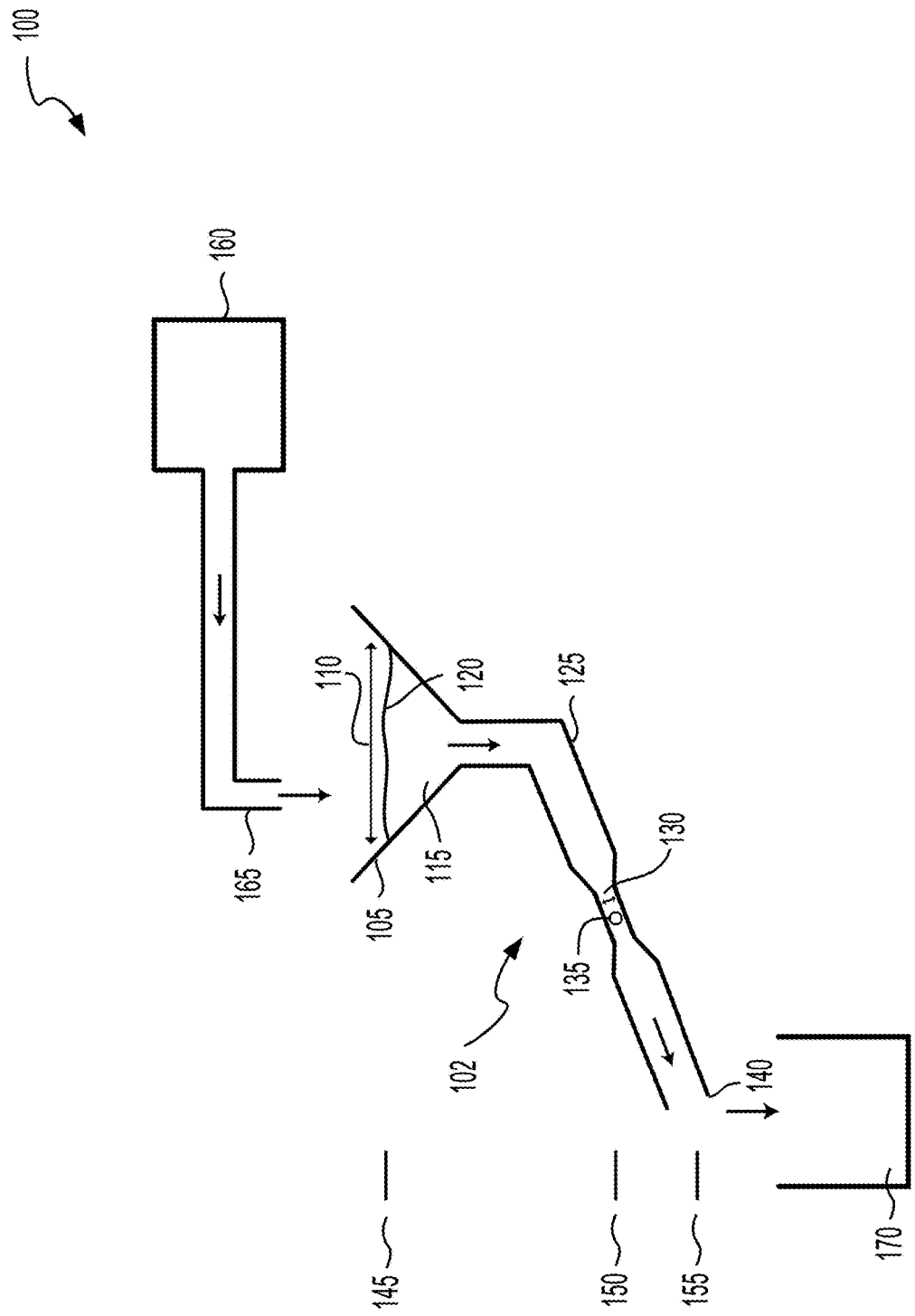
FIG. 1 illustrates a schematic diagram of a flow cell system, according to an embodiment.

Following below are more detailed descriptions of various concepts related to and implementations of systems, methods, and apparatuses for open-aperture flow cells. The various concepts introduced above and discussed in greater detail below can be used for on-line optical analysis of process fluids, such as molten salts or mineral slurries.

There are few automated tools for monitoring the composition of molten process salts. Most composition analysis requires sampling and manual analysis in a lab. This is problematic due to long turn-around times, low-throughput, high labor costs, and danger to workers. Manual sampling approaches may not be amenable to industrial scale-up and are too low throughput to support the goal of near real-time sampling-based process monitoring. Manual sampling and off-line analysis may produce non-representative samples and feedback lag. This can lead to poor process control. Additionally, manual sampling and off-line analysis may introduce human error and safety concerns. Furthermore, manual handling of samples complicates safeguards and material accountancy procedures in nuclear applications.

Along with the extreme operating conditions, another challenge for molten salt sampling can include inhomogeneity due to entrained particles and surface dross (e.g., mass of solid impurities). These inhomogeneities can be problematic for conventional dip sampling methods because these methods are low throughput and only capture a small cross-section of the bulk salt. This can lead to a high risk of non-representative samples. Furthermore, dip samplers penetrate the dross layer, which increases the risk of obtaining a non-representative sample.

Conventional cells for optical analysis face a number of challenges for deployment in extreme process conditions. For example, window materials currently used in molten salt applications do not have a sufficient working lifetime to enable process deployment in an industrial molten salt facility and window materials used for on-line optical analysis of mineral slurries need to be replaced frequently. Static (e.g., no-flow) windowless cells can be used with molten salts in laboratory settings. These cells rely on surface tension to retain molten salt in the cell, which limits the size of the orifice that can be used. Furthermore, surface tension based windowless cells are not suitable for use in sampling loop flow systems due to the risk of leaking. Microfluidic systems can achieve flow through windowless optical analysis cells, however, these systems also rely on surface tension to maintain the free fluid surfaces and cannot be used with complex process solutions containing particulates because the small channels would become clogged.

The present disclosure is directed to systems and methods for open-aperture flow cells. The present solution can be used for on-line optical analysis of process fluids, such as molten salts or mineral slurries. For example, the open-aperture flow cell can combine gravity flow with the Venturi effect to passively couple fluid pressure at an orifice with ambient gas pressure to enable optical analysis of free surfaces of fluid flowing through a conduit. The systems and methods of the present disclosure can enable on-line monitoring of fluids (e.g., molten salts, mineral slurries, etc.) with analytical techniques that are conventionally performed off-line.

FIG. 1 illustrates a schematic diagram of a flow cell system 100. The flow cell system 100 can include a flow cell 102 (e.g., gravity flow cell, open-aperture gravity flow cell, flow cell system, open-aperture gravity flow cell with passive pressure coupling, dual-aperture gravity flow cell, gravity flow windowless optical cell, open-orifice flow cell, open-orifice gravity flow cell, open-orifice gravity flow cell with passive pressure coupling, etc.). The flow cell system 100 can be part of a sampling loop. The sampling loop can be used to draw fluid into a lower-radiation or lower temperature area for analysis. The flow cell system 100 can include one or more flow cells.

The flow cell system 100 can include a vessel 105 (e.g., reservoir, tank, funnel, etc.). The flow cell 102 can include the vessel 105. The vessel 105 can be made of a material that is compatible with the process fluid and process temperature. The material can include metals, ceramics, polymers, salt, composite materials, coated materials, or layered materials. The vessel 105 can be configured to receive fluid.

The flow cell system 100 can include a fluid 115. The flow cell 102 can include the fluid 115. The fluid 115 can be located in the vessel 105. The fluid 115 can include at least one of an aqueous fluid, an organic fluid, a molten salt, a molten metal, or a mineral slurry. The fluid 115 can include fluid to be analyzed. The fluid 115 can include entrained gases or entrained solids.

The fluid 115 can include a fluid surface 120 (e.g., free fluid surface). The fluid surface 120 of the fluid 115 can be vented (e.g., exposed) to a first gas pressure (e.g., first pressure). For example, the fluid 115 can be vented to air with the first gas pressure. The first gas pressure can include atmospheric pressure or a cover gas pressure. The vessel 105 can be vented to the first gas pressure. The fluid surface 120 of the fluid 115 can be located at a first elevation 145. The first elevation 145 can be fixed or adjustable. The fluid surface 120 can have a first cross-sectional area 110. The first cross-sectional area 110 can be fixed or adjustable.

The flow cell system 100 can include a conduit 125 (e.g., main conduit, channel, flow channel, pipe, etc.). The flow cell 102 can include the conduit 125. The conduit 125 can be in fluid communication with the vessel 105. The conduit 125 can be made of a material that is compatible with the process fluid and process temperature. The material can include metals, ceramics, polymers, salt, composite materials, coated materials, or layered materials. Tooling (e.g., scrapers, drills, reamers, borers, or high-speed gas jets, etc.) may be used to clear the conduit 125 of clogs or deposits. Lasers, scrapers, drills, reamers, borers, or high-speed jets can be used to form the conduit 125 in a solid material.

The conduit 125 can be positioned downstream of the vessel 105. The vessel 105 can be positioned upstream of the conduit 125. The fluid 115 can flow by the force of gravity out of vessel 105 through the conduit 125. The conduit 125 can be fluidly coupled to the vessel 105. The conduit 125 can have straight segments, curved segments, and/or angled segments.

The conduit 125 can have a region with a second cross-sectional area 130. The second cross-sectional area 130 can be less than the first cross-sectional area 110. The second cross-sectional area 130 can be fixed or adjustable. The first cross-sectional area 110 or the second cross-sectional area 130 can be adjusted to recalibrate the flow cell system 100 to account for the reduction of the second cross-sectional area 130 over time. The first elevation 145 can be adjusted to recalibrate the flow cell system 100 to account for the reduction of the second cross-sectional area 130 over time. The reduction of the second cross-sectional area 130 can be caused by (e.g., due to) the deposition of material on walls of the conduit 125. For example, material can be deposited on the inner walls of the conduit 125. The conduit 125 can have a circular cross-section, a rectangular cross-section, or a variety of other shapes. For example, the second cross-sectional area 130 can be circular. The second cross-sectional area 130 can be rectangular.

The conduit 125 can include one or more orifices 135 (e.g., holes, apertures, openings, slots, etc.). The one or more orifices 135 can be disposed (e.g., located, positioned) on the walls of the conduit 125. The one or more orifices 135 can be vented (e.g., exposed) to the first gas pressure. For example, the fluid 115 at the one or more orifices 135 can be vented to the same air as the fluid surface 120 in the vessel 105. The one or more orifices 135 can be vented to a second gas pressure. The second gas pressure can be greater than the first gas pressure. For example, the free fluid surface at the one or more orifices 135 can be vented (e.g., exposed) to a purge gas flow. The one or more orifices 135 can be located at a second elevation 150. The second elevation 150 can be lower than the first elevation 145. For example, the second elevation 150 can be less than the first elevation 145. The second elevation 150 can be fixed or adjustable. The second elevation 150 can be adjusted to recalibrate the flow cell system 100 to account for the reduction of the first cross-sectional area 110 or the second cross-sectional area 130 over time. The reduction of the cross-sectional areas can be caused by (e.g., due to) the deposition of material on the walls of the conduit 125 or vessel 105. For example, material can be deposited on the inner walls of the conduit 125. The one or more orifices 135 can be circular in shape. Tooling (e.g., scrapers, drills, reamers, borers, or high-speed gas jets, etc.) may be used to clear the one or more orifices 135 of clogs or deposits. Lasers, scrapers, drills, reamers, borers, or high-speed jets can be used to form the one or more orifices 135 in a solid material.

The flow cell system 100 can include one or more orifice conduits (not shown) fluidly coupled to the one or more orifices 135. For example, the one or more orifices 135 can incorporate one or more orifice conduits that protrude from the conduit 125. The one or more orifice conduits can include one or more channels, one or more flow channels, one or more tubes, or one or more pipes.

The conduit 125 can include an outlet 140. The outlet 140 of the conduit 125 can be vented (e.g., exposed) to the first gas pressure. For example, the fluid 115 at the outlet 140 can be vented to the same air as the fluid surface 120 in vessel 105. The outlet 140 of the conduit 125 can be vented (e.g., exposed) to a third gas pressure (e.g., third pressure). The third gas pressure can be greater than or less than the first gas pressure. For example, the outlet 140 of the conduit 125 can be greater than the first gas pressure due to exposure to a purge gas or the outlet 140 of the conduit 125 can be less than the first gas pressure due to pressure gradients in a vacuum system. The outlet 140 can be located at a third elevation 155. The third elevation 155 can be lower than the second elevation 150. For example, the third elevation 155 can be less than the second elevation 150. The third elevation 155 can be the same as the second elevation 150. The third elevation 155 can be lower than the first elevation 145. For example, the third elevation 155 can be less than the first elevation 145.

The conduit 125 can include internal structures. The internal structures can be configured to mix the fluid 115. The internal structures can affect the distribution of entrained particles or gases in the conduit 125. The conduit 125 can include a plurality of flow paths which combine, split, or split and recombine so as to partition the fluid or to affect the distribution of particles or other fluid contents in the conduit 125. The conduit 125 may be shaped so as to optimize heat transfer to or from the fluid 115 in the conduit 125. The conduit 125 may be structured such that the flow profile at the one or more orifices 135 is optimized to the analytical technique used to characterize the fluid 115.

The flow cell system 100 can include a fluid source 160 (e.g., supply vessel, process vessel, reservoir, etc.). The fluid source 160 can be in fluid communication with the vessel 105. For example, the fluid source 160 can be fluidly coupled with the vessel 105 via a fluid source conduit 165 (e.g., pipe, channel, flow channel, etc.). The fluid source 160 can be coupled with vessel 105 via a solid material transfer mechanism such as a conveyor belt or screw conveyor (not shown). The vessel 105 can be positioned downstream of the fluid source 160. The fluid source 160 can be positioned upstream of the vessel 105. The fluid source 160 can be positioned at a higher, lower, or the same elevation as the flow cell 102. The fluid source 160 can be made of a material that is compatible with the process fluid and process temperature. The material can include metals, ceramics, polymers, salt, composite materials, coated materials, or layered materials. The fluid 115 can flow from the fluid source 160 to the vessel 105. The fluid 115 can flow from the fluid source 160 to the vessel 105 via the fluid source conduit 165. The fluid 115 can flow by the force of gravity from the outlet of the fluid source conduit 165 to the vessel 105 so as to retain a free fluid surface 120 in vessel 105. For example, the fluid 115 can drip or stream into the vessel 105.

The fluid 115 from the fluid source 160 can be transported to the vessel 105. For example, the fluid source 160 can be transported to the vessel 105 by at least one salt transport mechanism which can include mechanical pumping, fluidic pumping (e.g., vortex diode pumping, reverse flow diverter pumping, etc.), solid conveyance, vacuum filling, gravity flow, split stream sampling, pressurization of the fluid source 160, or solid salt transport. For example, the flow cell system 100 can include a mechanical pump fluidly coupled to the fluid source 160.

The flow cell system 100 can include a fluidic pump (e.g., valveless pump) fluidly coupled to the fluid source 160. Fluidic pumps can be free of moving parts and can be powered and controlled by manipulating cover gas pressure and flow. Fluidic pumps can include gas-lift pumps, jet pumps, diode pumps, and flow diverter pumps. The flow cell system 100 can include a gas lift. Gas lifts can raise fluid by introducing bubbles of compressed gas into an outlet tube, which has the effect of reducing the hydrostatic pressure in the outlet side of the tube relative to the hydrostatic pressure at the inlet side of the tube.

The flow cell system 100 can include a vacuum transport mechanism. Vacuum transport can be performed without wetted moving parts or wetted mechanical seals, which can be beneficial for molten salt applications. The flow cell system 100 can include a solid material transport mechanism. Solid transport can include a solid supplied by a screw conveyor. A vertical screw conveyor (e.g., packed vertical screw conveyor system) can be used for liquid-solid salt transport. The material can be transported as powder, pellets, or solid material adhered to another material (e.g., a conveyor, packing material, beads, etc.). The solid can be melted in vessel 105 or before being transported to vessel 105.

The fluid 115 can be transported from the fluid source 160 via the fluid source conduit 165. For example, the fluid 115 can be transported from the fluid source 160 through the fluid source conduit 165 to the vessel 105. The fluid source conduit 165 can be made of a material that is compatible with the process fluid and process temperature. The material can include metals, ceramics, polymers, salt, composite materials, coated materials, or layered materials. Tooling (e.g., scrapers, drills, reamers, borers, or high-speed gas jets, etc.) may be used to clear the fluid source conduit 165 of clogs or deposits. Lasers, scrapers, drills, reamers, borers, or high-speed jets can be used to form the fluid source conduit 165 in a solid material.

As the fluid 115 is transported into the vessel 105 from the fluid source conduit 165, the fluid 115 can flow by the force of gravity out of the vessel 105 through the conduit 125. Flow of the fluid 115 into the vessel 105 can be controlled such that the first elevation 145 is approximately constant (e.g., within a margin of error). For example, flow of the fluid 115 into the vessel 105 can be controlled such that the first elevation 145 is approximately constant while the fluid 115 is being characterized or analyzed.

The outlet of conduit 125 can be vented to the third gas pressure. A negative pressure gradient can exist between the gas outside the outlet 140 (e.g., at the third gas pressure) and the fluid 115 at the outlet 140. The fluid 115 can flow under gravity through the conduit 125 back to fluid source 160. The fluid 115 can flow under gravity through the conduit 125 to a third vessel 170 (e.g., collection tank, vacuum chamber, etc.).

Figure 2:
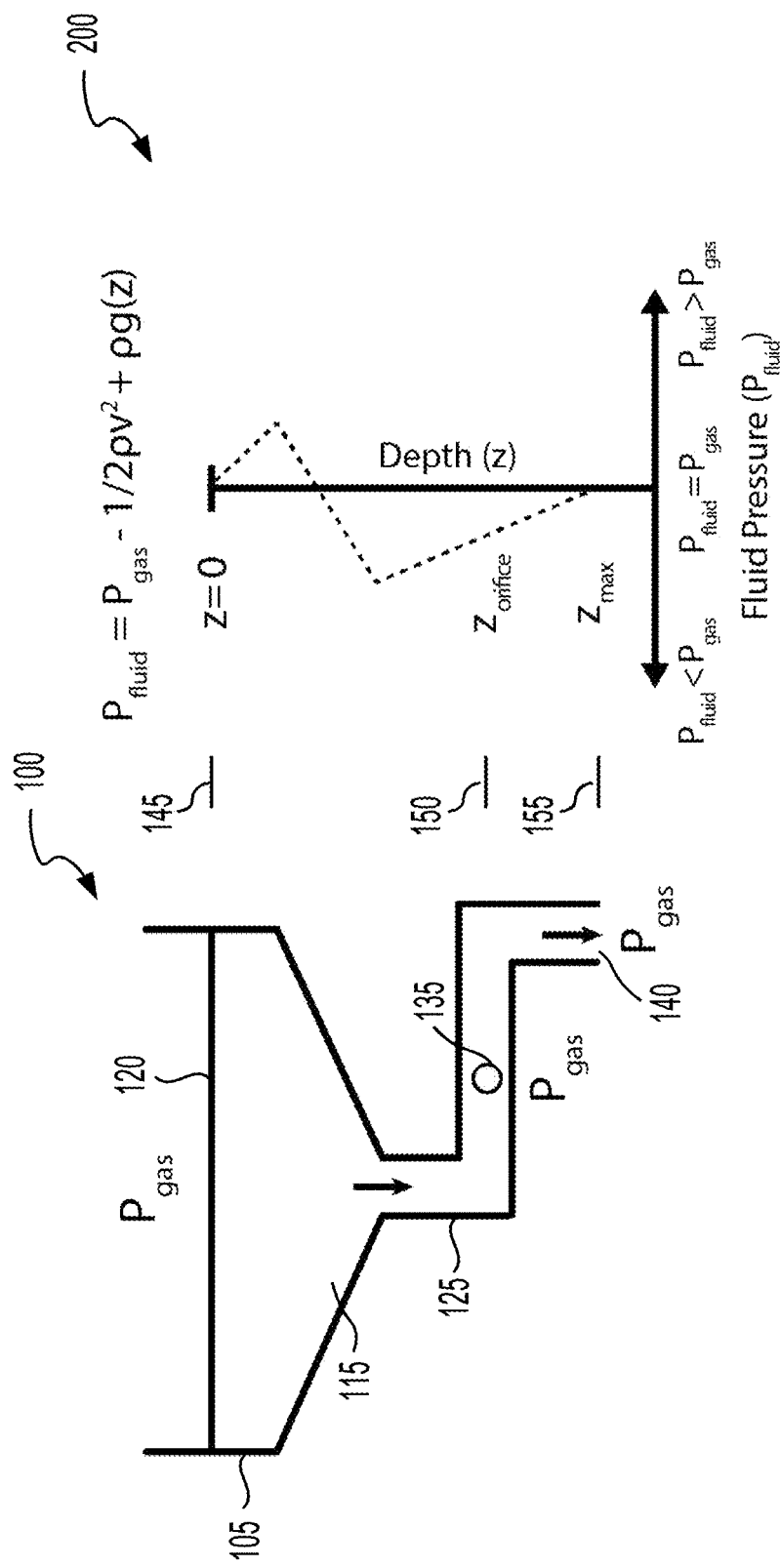
FIG. 2 illustrates a schematic diagram of a flow cell and a plot of a simplified pressure profile, according to an embodiment.

FIG. 2 illustrates a schematic diagram of the flow cell system 100 and a plot of a simplified pressure profile 200. The flow cell system 100 can include a gravity flow cell or an open-aperture (e.g., open-orifice) gravity flow cell. The schematic diagram and plot illustrate an operating mechanism of the open-orifice gravity flow cell. The flow cell system 100 can include one or more orifices 135. In the plot of the pressure profile, the fluid pressure, Pfluid, is shown as a function of fluid depth and fluid velocity and is given by Equation 1:

$$P_{fluid} = P_{gas} - \frac{1}{2}\rho v^2 + \rho g(z) \tag{1}$$

where $P_{gas}$ is the first gas pressure, p is the density of the fluid (e.g., fluid density), g is the gravitational constant, v is the fluid velocity, and z is the fluid head. Equation 1 can include a simplified representation of the flow profile, which can neglect some effects of the one or more orifices 135 on the pressure profile.

A constriction in the flow cell system 100 can cause an increase in the fluid velocity in the region of the constriction, which can be accompanied by a reduction in the fluid pressure at the constriction. This phenomenon is known as the Venturi effect. The reduction in cross-sectional area can occur in any location between the free fluid surface 120 of the fluid 115 in the vessel 105 and the one or more orifices 135 so that the second cross-sectional area 130 is less than the first cross-sectional area 110. The Venturi effect in a gravity flow cell can enable passive pressure coupling between the flowing fluid (e.g., fluid 115) and the gas outside the one or more orifices 135. The passive pressure coupling can cause there to be a negative pressure gradient between the fluid 115 at the one of more orifices 135 and the gas at the one or more orifices 135 such that the fluid 115 does not flow through the one or more orifices 135 of the conduit 125.

The second cross-sectional area 130 can be sufficiently smaller than the first cross-sectional area 110 such that the negative pressure gradient between the fluid at the one or more orifices 135 and the gas outside the one or more orifices 135 is large enough to counteract any forces (e.g., driving forces) that might otherwise drive the fluid 115 out of the conduit 125 through the one or more orifices 135. These forces may include gravity, wetting, vibrations, or other physical perturbations of the flow cell system 100. Gravity flow through the one or more orifices 135 might be enabled by expansion of gas bubbles or differences in elevation between two or more orifices. Multiple orifices on the conduit 125 can be positioned such that their outlets are all at the same elevation (e.g., second elevation 150). The one or more orifices 135 may be oriented in any direction with respect to gravity. For example, two orifices of the one or more orifices 135 can be oriented such that there is one orifice on each opposing surface of the conduit 125 with the orifices centered on the conduit 125 in the vertical direction (e.g., direction of the gravitational force) and both orifices are oriented perpendicular with respect to gravity. This orientation can be suitable for transmission optical measurements.

In addition to the pressure gradient and potential driving forces, the presence or absence of flow through the one or more orifices 135 can be determined by the shape, wetting properties, cross-sectional area, and length of the one or more orifices 135. These properties can determine the magnitude of the resistance to flow through the one or more orifices 135 from fluidic resistance, surface tension, and capillary forces. For example, an orifice conduit including a two-inch-long tube protruding from the conduit 125 can provide more resistance to flow than a simple hole (of the same diameter) in a 0.125-inch-thick wall. Increasing the resistance of the one or more orifices 135 can expand the working range of other parameters that affect the performance of the flow cell system 100 (e.g., flow rates, vibration, geometric precision, etc.). Increasing the resistance of the one or more orifices 135 can include changing the shape, wetting properties, cross-sectional area, or length of the one or more orifices 135 or orifice conduits.

Figure 3:
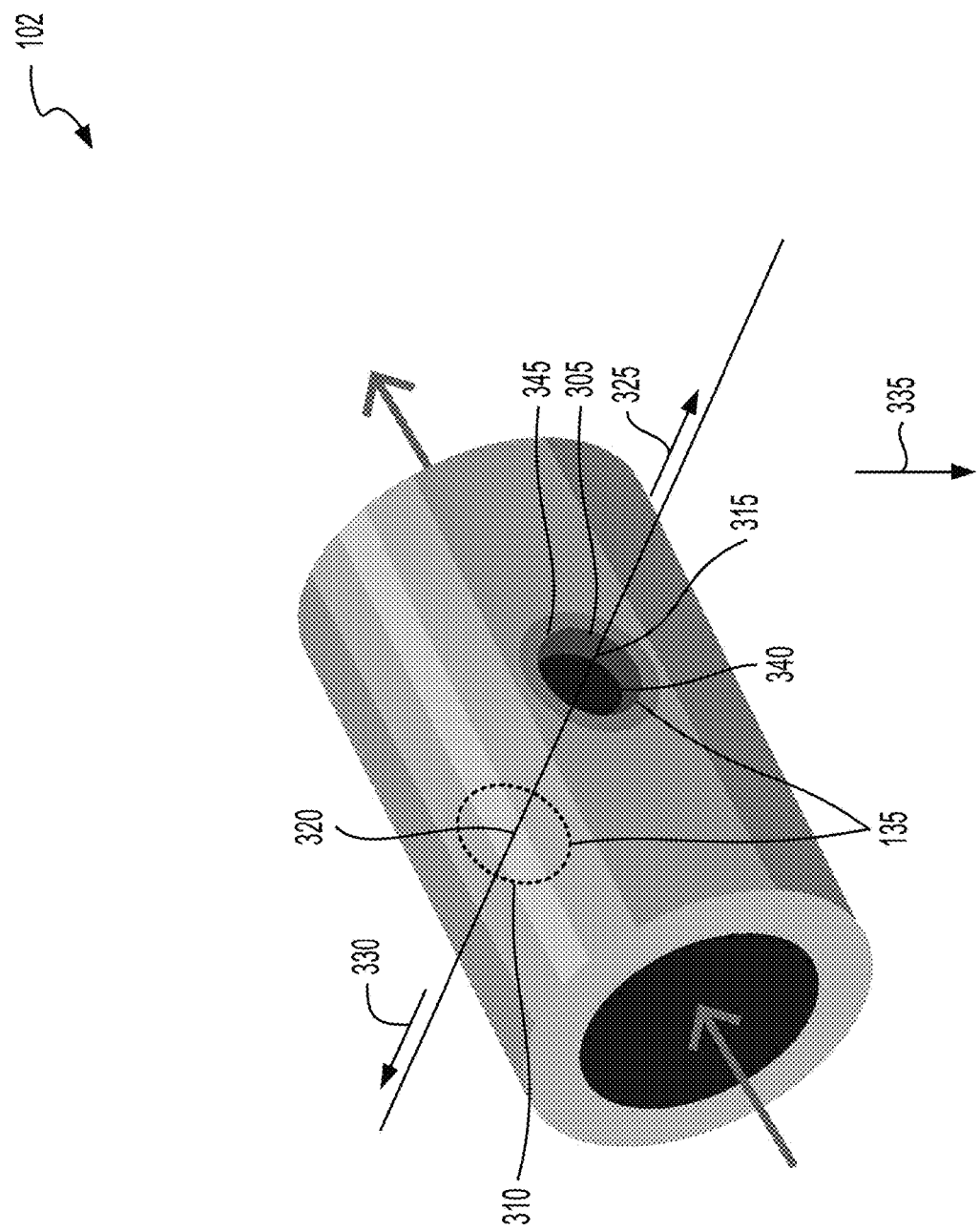
FIG. 3 illustrates a flow cell, according to an embodiment.

FIG. 3 illustrates the flow cell 102. The flow cell 102 can include an open-aperture gravity flow cell with passive pressure coupling between the fluid pressure at the aperture (e.g., one or more orifices 135) and the cover gas pressure. The one or more orifices 135 can include a first orifice 305 located at a first orifice elevation 315. The one or more orifices 135 can include a second orifice 310 located at a second orifice elevation 320. The first orifice elevation 315 can be equal to the second orifice elevation 320. The first orifice 305 can be oriented in a first direction 325. The second orifice 310 can be oriented in a second direction 330. The first direction 325 can oppose the second direction 330. The first direction 325 and the second direction 330 can be perpendicular with respect to gravity. For example, the first direction 325 and the second direction 330 can be perpendicular with respect to the direction of gravity 335. The orientation in which the first orifice 305 is oriented in the first direction 325 and the second orifice 310 is orientated in the second direction 330 opposing the first direction 325 and perpendicular to the direction of gravity 335 can be suitable for transmission optical measurements.

The one or more orifices 135 can be vented to the first gas pressure. The one or more orifices 135 can be vented to the second gas pressure. The second gas pressure can be greater than the first gas pressure. The outlet 140 can be vented to the first gas pressure. The outlet 140 can be vented to the third gas pressure. The third gas pressure can be greater than or less than the first gas pressure. Venting the one or more orifices 135, the outlet 140, and the fluid surface 120 to the same gas pressure (e.g., first gas pressure, $P_{gas}$, etc.) can enable passive pressure coupling between the fluid pressure at the one or more orifices and the gas pressure outside the one or more orifices 135. Venting the one or more orifices 135 and the outlet 140 to second and third gas pressures, respectively, that deviate from the first gas pressure within a range can enable pressure coupling between the fluid pressure at the one or more orifices and the gas pressure outside the one or more orifices 135.

This pressure coupling and the reduced cross-sectional area of conduit 125 in the region of the one or more orifices 135 (e.g., second cross-sectional area 130) compared with the first cross-sectional area 110 can allow for a negative pressure gradient between the fluid in conduit 125 in the region of the one or more orifices 135 and the gas outside the one or more orifices 135 so that fluid 115 flows through the conduit 125 but does not flow through the one or more orifices 135 because there is no positive pressure gradient to drive flow through the one or more orifices 135. The velocity and pressure profiles in the flow cell system 100 can be a function of the fluid head and the cross-sectional area of the conduit 125. The fluid head in the conduit can be sufficiently large such that the flow velocity in conduit 125 is high enough to cause a sufficient pressure drop in the orifice region to prevent fluid from leaking out of the one or more orifices 135.

The flow cell system 100 can include an orifice inlet 340. The flow cell 102 can include the orifice inlet 340. The orifice inlet 340 can include an inlet of the one or more orifices 135. The flow cell system 100 can include an orifice outlet 345. The flow cell 102 can include the orifice outlet 345. The orifice outlet 345 can include an outlet of the one or more orifices 135. The orifice outlet 345 can be located upstream of the orifice inlet 340. The orifice inlet 340 can be located downstream of the orifice outlet 345. For example, the first orifice 305 can include the orifice inlet 340. The first orifice 305 can include the orifice outlet 345. The one or more orifices 135 can be oriented perpendicular to the axis of the conduit 125.

Figure 4:
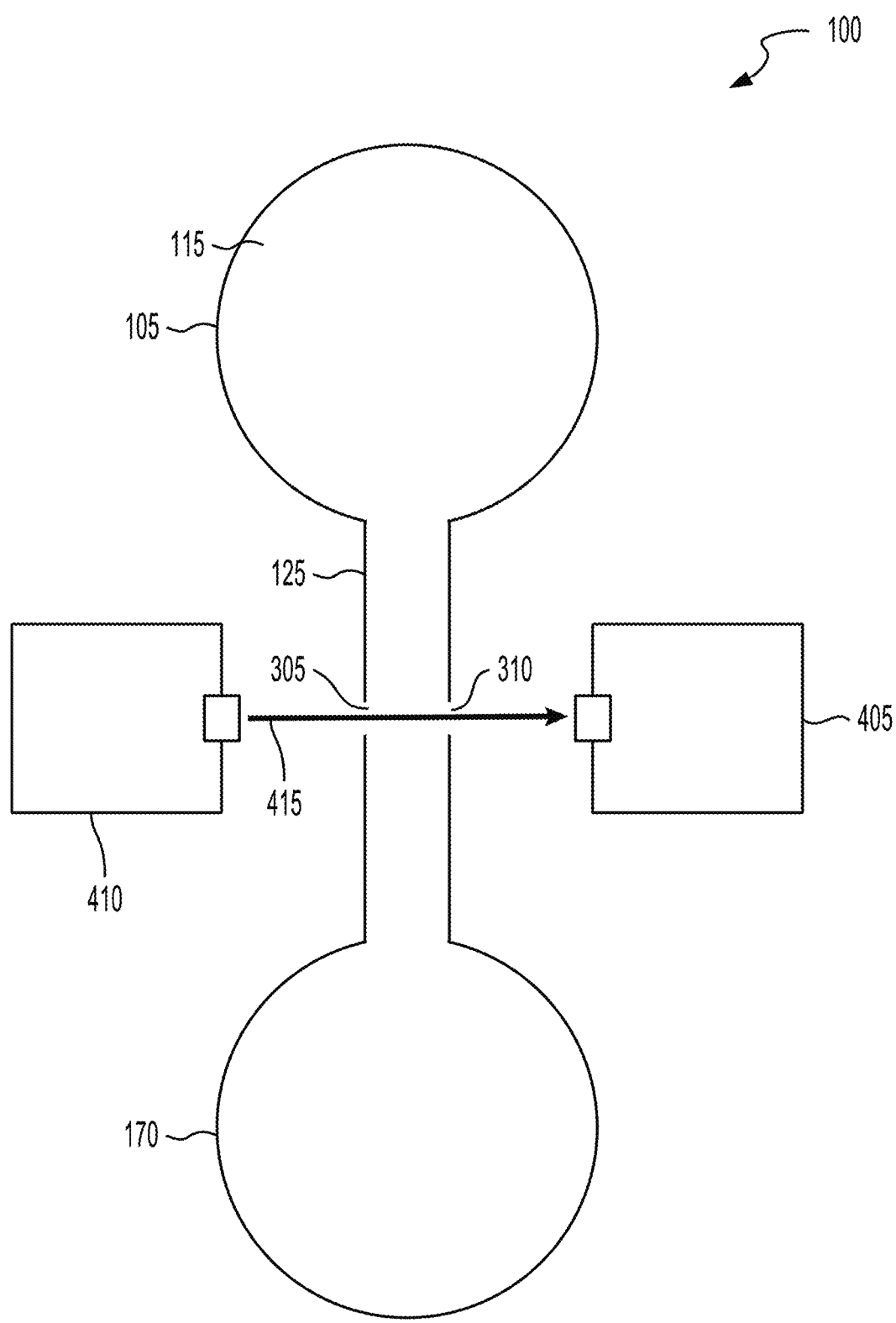
FIG. 4 illustrates a flow cell optical analysis system, according to an embodiment.

FIG. 4 illustrates the flow cell system 100. The flow cell system 100 can include a flow cell optical analysis system. The flow cell system 100 can include a windowless optical analysis spectroscopy system. The flow cell system 100 can include a dual-aperture gravity flow cell for transmission spectroscopy on flowing fluid. The flow cell system 100 can have two opposing orifices (e.g., first orifice 305 and second orifice 310) oriented perpendicular to gravity and to the direction of flow. A light source 410 can provide illumination of the fluid 115 in the conduit 125.

The flow cell system 100 can include a detector 405 (e.g., analysis system, Raman spectrometer, etc.). The detector 405 can be configured to characterize the fluid 115 in the conduit 125. The detector 405 can be integrated with the flow cell system 100. The detector 405 can characterize the fluid 115 in the conduit 125. The detector 405 can characterize the fluid 115 via an analytical technique. The detector 405 can measure a temperature, a flow rate, a density, a viscosity, a chemical composition, an isotopic composition, entrained gases, entrained particles, speciation, spectroscopic signatures, radiation signatures, particle content, or particle size distribution of the fluid 115 located in the conduit 125. The flow cell system 100 can include one or more detectors. The one or more detectors can enable multi-modal analysis with a single system. The detector 405 can be at a stand-off distance from the conduit 125. This can be useful in extreme processing conditions (e.g., high temperature) because less robust instrumentation (e.g., detector 405) can be used. Light from the light source 410 can be received by the detector 405 via a light path 415.

The first orifice 305 and the second orifice 310 can be opposing. The two opposing orifices in the conduit 125 can create a windowless optical path that can be used for transmission absorption spectroscopy techniques. Other arrangements of the one or more orifices 135 around the conduit 125 can allow for observations (e.g., measurements) in the orthogonal or backscatter/reflection directions. The detector 405 can be a stand-off system or may have components that are in contact with the fluid 115 or in contact with the conduit 125 or with structures of one or more orifices 135. The fluid 115 may be interrogated (e.g., analyzed, characterized, etc.) with collimated or non-collimated light in the ultra-violet, visible, or infrared range or with other wavelengths of electromagnetic radiation such as X-rays or gamma rays. Example techniques include Raman spectroscopy, Fourier transform infrared spectroscopy, laser induced breakdown spectroscopy, and X-ray fluorescence spectroscopy. The fluid 115 may be interrogated while it is in the conduit 125 or material may be extracted from the conduit 125 by techniques such as laser ablation or gaseous diffusion. Material removed from the conduit 125 may be transported into an instrument for analysis by techniques such as mass spectrometry.

The gas pressure at the one or more orifices 135 can be controlled (e.g., actively controlled) to manipulate the shape of the gas-liquid interface. A flow of purge gas may be applied to the region around the one or more orifices 135 to prevent gas or vapor from coming into contact with components of the detector 405. Potentials can be applied across electrodes located within the conduit 125 to perform complementary measurements or to perform electrochemical manipulations of the fluid 115 for techniques such as spectroelectrochemistry.

Figure 5:
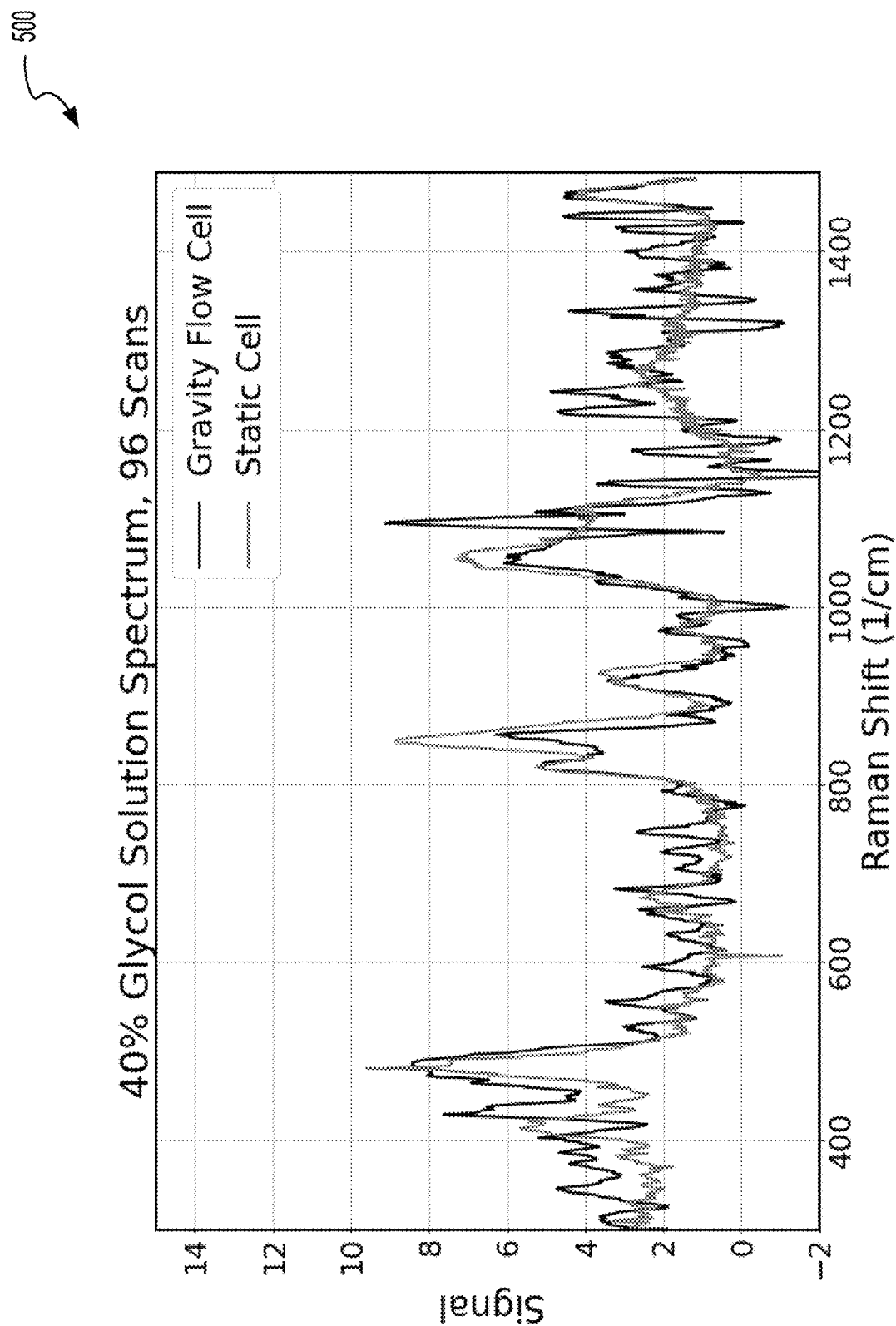
FIG. 5 illustrates Raman spectra for a static cell and a gravity flow cell, according to an embodiment.

FIG. 5 illustrates Raman spectra 500 for a static cell and a gravity flow cell. The flow cell system 100 can include a dual-aperture gravity flow cell for transmission spectroscopy on flowing fluid. The flow cell system 100 can use Raman spectroscopy at room temperature using a water-glycol solution, which has a viscosity matched to eutectic LiCl—KCl molten salt. LiCl—KCl molten salt can be used in electrochemical used nuclear fuel reprocessing. The flow cell system 100 can have two opposing orifices oriented perpendicular to gravity and to the direction of flow. A 1 mm diameter stainless steel orifice (e.g., a hole in the flow cell wall) can be used for optical access including both laser illumination and signal collection from the same orifice. A 20 mm long orifice with an internal diameter of 5 mm can be used as a laser beam exit. This larger aperture can be machined into a 0.25 inch outer diameter screw, which can enable adjustments to the flow cell cross-sectional area at the aperture region.

The Raman spectra 500 shows glycol peaks from measurements in a static windowless optical cell and in the flow cell system 100 operated at a flow rate of approximately 700 mL per minute. Static windowless cells can be used for molten salt optical analysis. In some embodiments, the static windowless cell included a 0.375 inch inner diameter (ID) well in acrylic with two opposing sapphire orifice fittings (both 1.5 mm ID) press-fit into the cell walls. One sapphire orifice was used as an aperture for optical sampling, while the other was used as an exit for the laser beam. These results show that the dynamic flow conditions in the gravity flow cell do not significantly disrupt the Raman signals compared with the conventional static windowless optical cell.

Figure 6:
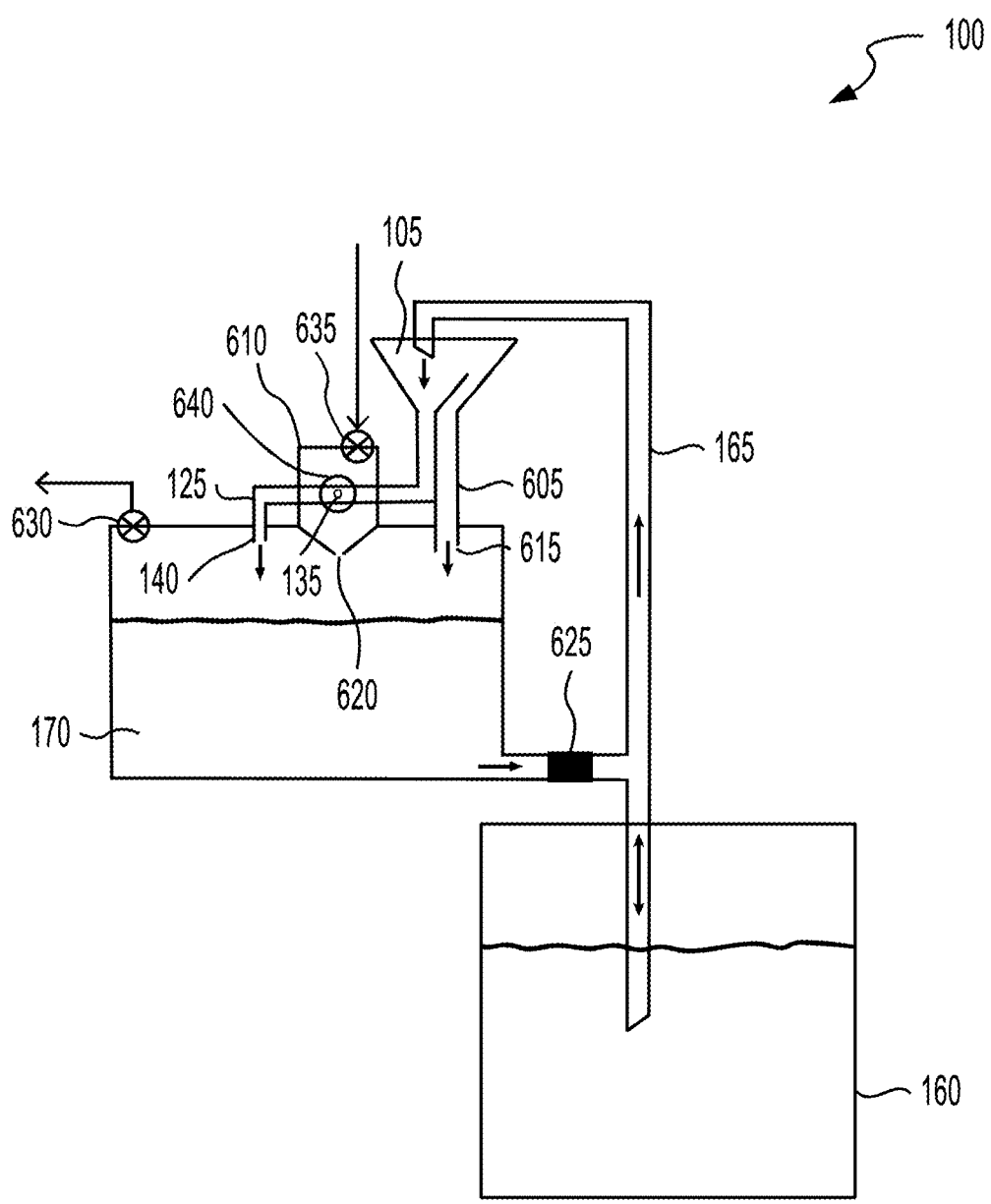
FIG. 6 illustrates a schematic diagram of a flow cell system, according to an embodiment.

FIG. 6 illustrates a schematic diagram of the flow cell system 100 according to an embodiment. The flow cell system 100 can include a vacuum-supplied gravity flow windowless optical loop for on-line optical analysis of fluid. The flow cell system 100 can include an overflow conduit 605 (e.g., overflow path, overflow bypass, etc.). The fluid surface 120 of the fluid 115 can be located at a fixed elevation. The fluid 115 from the fluid source conduit 165 can be split between the vessel 105 and the overflow conduit 605 via an overflow path. The flow rate in the fluid source conduit 165 can be set to be greater than the flow rate in the conduit 125. Overflow into the overflow conduit 605 can occur when more fluid 115 flows from the fluid source conduit 165 into the vessel 105 than can be contained in the vessel 105. In this configuration, the first elevation 145 can be fixed at the point of overflow from the vessel 105 (e.g., fixed elevation), which can fix the pressure head in the flow cell system 100 to provide a constant flow rate in the conduit 125. Without overflow, the first elevation 145 and the fluid head in the flow cell system 100 could vary with the flow rate of the pumping mechanism that supplies fluid 115 to the vessel 105 from the fluid source conduit 165. This could cause the flow rate in the conduit 125 to vary which could have a negative effect on the reproducibility of the measurements of the fluid 115. The configuration without an overflow path can be used with precision pumping.

The flow cell system 100 can be coupled with a third vessel 170 that is a vacuum tank. The flow cell system 100 can include an orifice chamber 610. The orifice chamber 610 around the one or more orifices 135 can protect the one or more orifices 135 from splashes and vapor. The flow cell system 100 can include an inlet (e.g., the fluid source conduit 165) from a fluid source 160. The flow cell 102 can include three outlets. The three outlets can include the outlet 140 of conduit 125, an overflow conduit outlet 615 (e.g., overflow path outlet, outlet of the overflow conduit 605, etc.), and an orifice chamber outlet 620 (e.g., outlet of the orifice chamber 610 around the one or more orifices 135). The inlet and the three outlets can be in fluid communication with the third vessel 170. The third vessel 170 can be sealed with a freeze valve 625 (e.g., freeze plug) for molten salt applications or with a mechanically sealed valve.

Flow can be generated by evacuating gas from the third vessel 170 through a valve 630 (e.g., gas-out valve), which can cause the fluid 115 to be transported through the fluid source conduit 165 into the flow cell 102. The flow cell system 100 can operate at any ambient pressure (e.g., first gas pressure), so the vacuum filling (e.g., coupled vacuum filling) and flow cell operations can be run concurrently to maintain a constant head of fluid at the first elevation 145 in the flow cell 102. Optical ports 640 (e.g., vacuum chamber optical ports, vacuum chamber viewports, etc.) can be located on the third vessel 170 to provide optical access to the one or more orifices 135 on the conduit 125. The optical ports 640 may not be wetted by the process fluid, so off-the-shelf components such as sapphire windows can be used for molten salt applications. A low flow of purge gas injected through a valve 635 (e.g., gas-in valve) can be used to protect the optical ports 640 from vapor deposition. This gas flow can also be used to help control the shape of the gas-liquid interface at the one or more orifices 135. A load cell, conductivity level sensors, and/or overflow conduit 605 can be used to monitor and control the salt levels in the flow cell 102 and third vessel 170. This vacuum-supplied gravity flow windowless optical loop can address a need for on-line optical analysis of molten salt without the need for salt-wetted windows or moving parts such as mechanical pumping mechanisms or mechanical valves. These valves can have high failure rates in molten salt systems and particularly in high-radiation systems.

Figure 7:
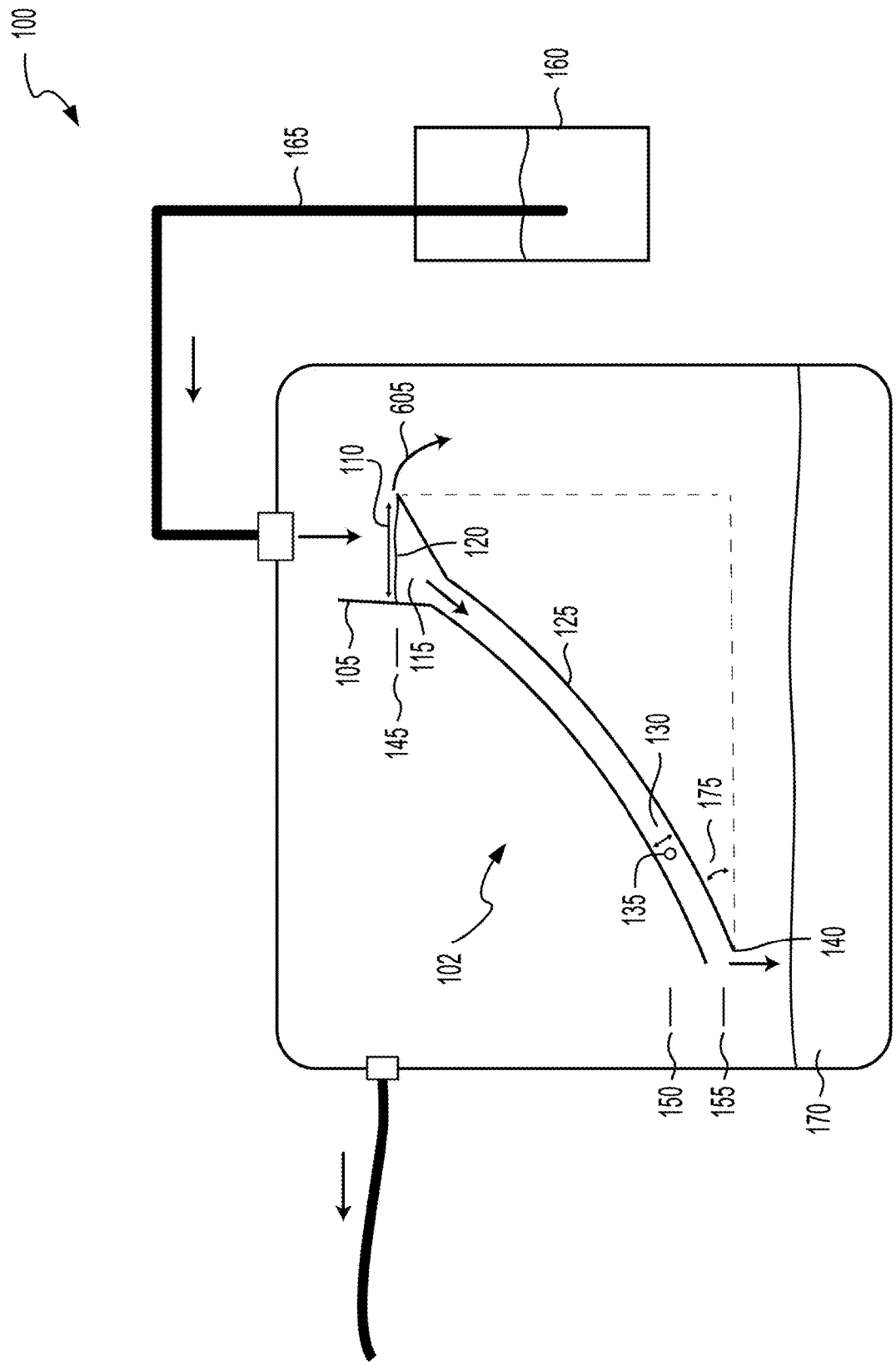
FIG. 7 illustrates a schematic diagram of a flow cell system, according to an embodiment.

FIG. 7 illustrates a schematic diagram of a flow cell system 100 according to an embodiment. The flow cell system 100 can include a vacuum-supplied open-aperture flow cell. The flow cell system 100 can include a 5.5 L vacuum chamber with a fluid inlet in its cover. A 9 inch long flow cell (e.g., conduit 125) can be fabricated from 0.0625 inch ID tubing with two opposing 1 mm ID apertures located 2 inches from the end of the flow cell 102. The flow cell 102 can have a 2 inch outer diameter (OD) funnel at its inlet (e.g., vessel 105). There can be a 1 inch gap between the water inlet from fluid source conduit 165 in the chamber cover and the top plane of the funnel (e.g., vessel 105).

The vacuum-filled open-aperture flow cell can be tested in different configurations. The configurations can be set by moving the flow cell outlet up or down. The funnel can be at the same orientation as the flow cell 102. Therefore, the total fluid head and cross-sectional area at the top of the flow cell 102 can be varied across the different configurations. Performance under each condition can be characterized according to the presence or absence of leakage from the one or more orifices 135. A 12 V low-flow (0.254 cfm at 0 psi) miniature air compressor can be used to pull a vacuum on the chamber and drive fluid flow into the flow cell 102 located in the chamber of the flow cell system 100.

For the embodiment in FIG. 7, a tilt angle 175 of 37° can produce pressure profiles that are suitable to prevent fluid flow through the one or more orifices 135. A tilt angle 175 of 42° can produce pressure profiles that are suitable to prevent fluid flow through the one or more orifices 135. Below a tilt angle 175 of 37° there can be insufficient head to produce the flow velocities required to prevent leakage from the one or more orifices 135. At larger tilt angles 175 (e.g., above 45°) there can be leakage from the one or more orifices 135. The hydrostatic pressure can be too large compared to the Venturi pressure drop to prevent leakage from the apertures. The maximum and minimum angles can be dependent on the specific geometric parameters of an embodiment and the properties of the fluid.

The flow restriction ratio can include the flow cell diameter (e.g., first cross-sectional area 110) at the free fluid surface 120 divided by the flow cell diameter (e.g., second cross-sectional area 130) in the region containing the one or more orifices 135. The flow restriction ratio and aperture diameter can be contributors to flow cell performance. Large flow restriction ratios can extend the range of suitable tilt angles and orifice diameters by increasing the pressure drop in the flow cell 102. The absolute aperture diameter, rather than the ratio of the aperture diameter to the flow cell diameter, can influence flow cell performance. The orifice diameter can be 60% of the flow cell diameter for this system. The vacuum-supplied open-aperture gravity flow cell design can be robust over the optimum tilt angle range and high flow restriction ratios can enable the use of aperture diameters that are sufficiently large for most types of optical analysis.

The overflow conduit 605 can route excess flow from the fluid source conduit 165 and set a fixed pressure head at the maximum fill level of the vessel 105 to provide a constant flow rate in the conduit 125. With the overflow conduit 605 and a flow rate in the fluid source conduit 165 that is greater than the flow rate in the conduit 125, the first elevation 145 (and therefore the flow rate in the conduit 125) can be approximately constant. Because flow in the conduit 125 can be dependent on the fluid head, the system with the overflow mechanism can be resistant to flow rate variability (which can result from systematic and random deviations in the pumping rate) in the fluid source conduit 165.

Figure 8:
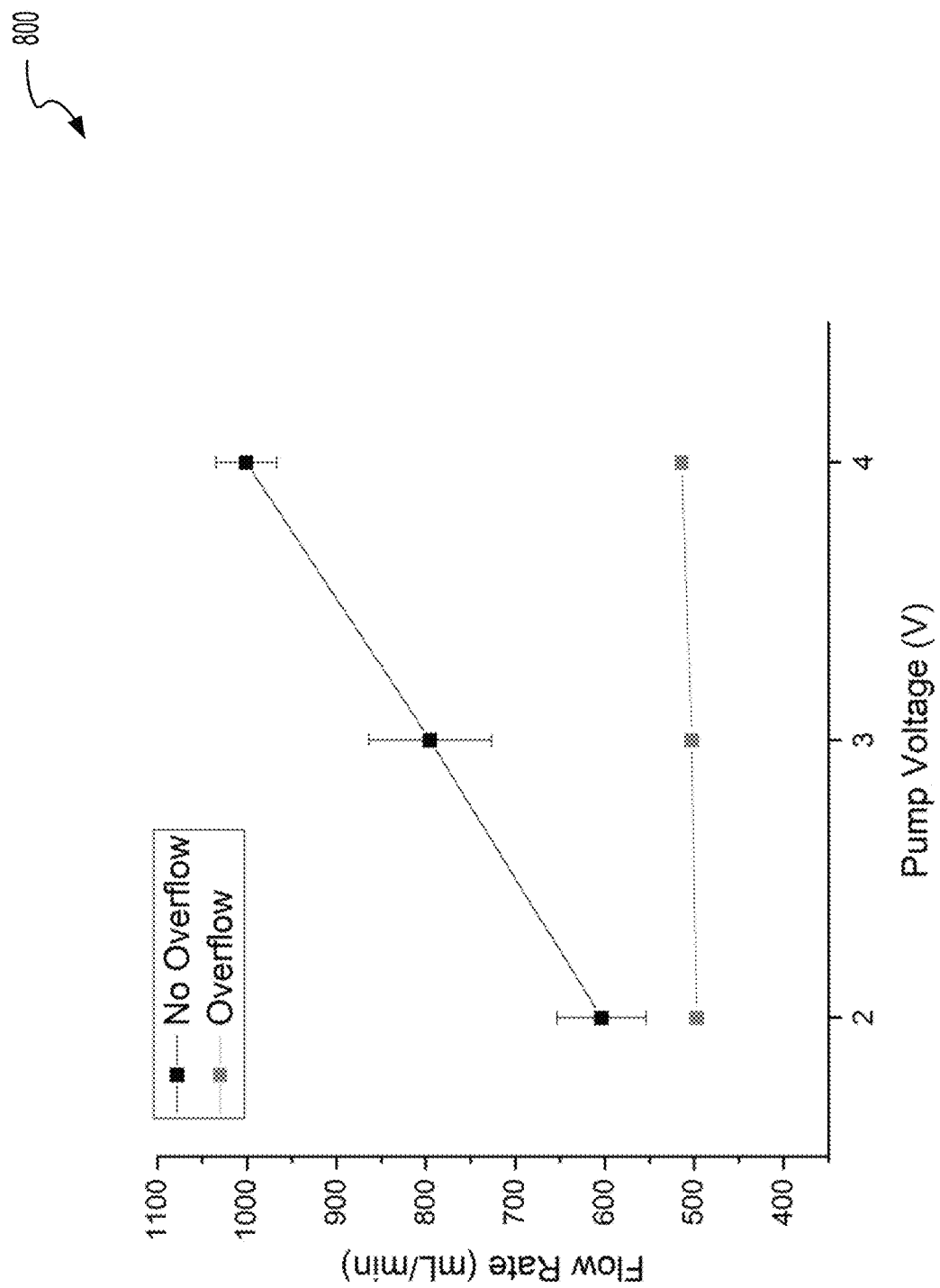
FIG. 8 illustrates vacuum fill flow rates with and without the partial bypass of fluid entering the vacuum chamber from a conduit, according to an embodiment.

FIG. 8 illustrates vacuum fill flow rates 800 with and without the partial bypass of fluid 115 entering the vacuum chamber from a conduit (e.g., fluid source conduit 165). The flow rate of the water entering the chamber through the fluid source conduit 165 can be determined by measuring the time to collect 500 mL of water at three different vacuum pumping rates. Flow rates can be measured with the flow cell 102 set at a tilt angle 175 of 42° where some of the flow from the fluid source conduit 165 overflowed from the vessel 105, bypassed the conduit 125, and drained directly into the bottom of the third vessel 170 (e.g., vacuum chamber). FIG. 8 shows the measured flow rates and their standard deviation (e.g., triplicate measurements) as a function of the voltage applied to the pump. Without the overflow conduit 605, the flow rate in the flow cell 102 can vary significantly, both due to the increased pumping rate across the different voltages and due to random error. The sources of error can include the seals on the third vessel 170. With the overflow conduit 605, the flow rate variability can be largely eliminated. This can demonstrate the ability of the overflow conduit 605 to enable a constant fluid head to be maintained in the vessel 105 to support reproducible flow cell operation.

Figure 9:
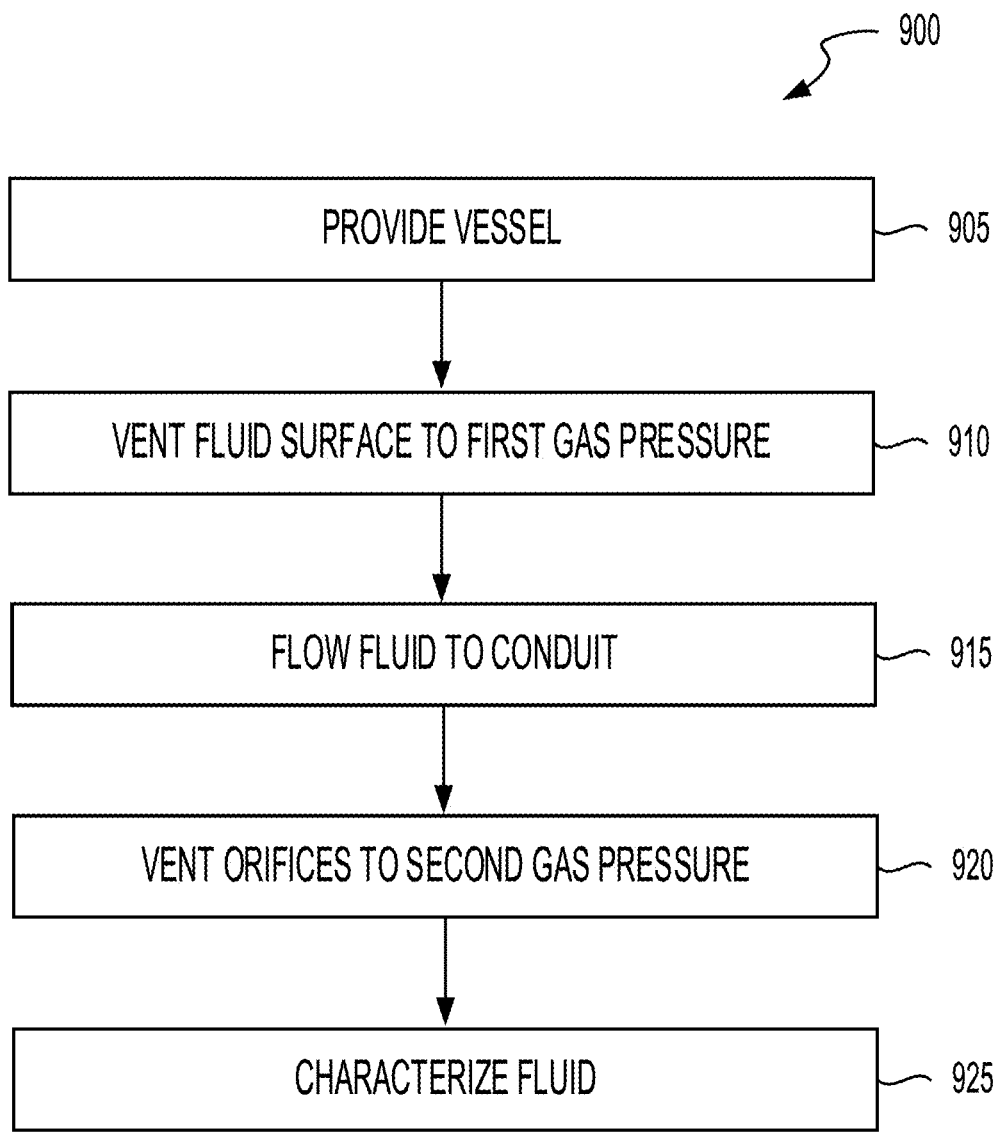
FIG. 9 illustrates a method for analyzing process fluids, according to an embodiment.

FIG. 9 illustrates a method 900 for analyzing process fluids. In brief summary, the method 900 can include providing a vessel (BLOCK 905). The method 900 can include venting a fluid surface to a first gas pressure (BLOCK 910). The method 900 can include flowing the fluid to a conduit (BLOCK 915). The method 900 can include venting one or more orifices to a second pressure (BLOCK 920). The method 900 can include characterizing the fluid (BLOCK 925).

The method 900 can include providing a vessel (BLOCK 905). The vessel can contain a fluid. The vessel can be made of a material that is compatible with the process fluid and process temperature. The material can include metals, ceramics, polymers, salt, composite materials, coated materials, or layered materials. The fluid can be located in the vessel. The fluid can include at least one of an aqueous fluid, organic fluid, molten salt, or molten metal. The fluid can include fluid to be analyzed. The fluid can include entrained gases or entrained solids.

The method 900 can include venting a fluid surface to a first gas pressure (BLOCK 910). For example, the fluid can be vented (e.g., exposed) to air at the first gas pressure. The first gas pressure can include atmospheric pressure or a cover gas pressure. The vessel can be vented to the first gas pressure. The fluid surface of the fluid can be located at a first elevation. The first elevation can be fixed or adjustable. The fluid surface can have a first cross-sectional area. The first cross-sectional area can be fixed or adjustable.

The method 900 can include flowing the fluid to a conduit (BLOCK 915). Flowing the fluid to the conduit can include flowing the fluid from the vessel to the conduit positioned downstream from the vessel. The conduit can have a region with a second cross-sectional area that is less than the first cross-sectional area. The conduit can have a variable cross-sectional area. The conduit can include one or more orifices in the region with the second cross-sectional area. The conduit can be in fluid communication with the vessel. The vessel can be in fluid communication with the conduit. The conduit can be made of a material that is compatible with the process fluid and process temperature. The material can include metals, ceramics, polymers, salt, composite materials, coated materials, or layered materials. Tooling (e.g., scrapers, drills, reamers, borers, or high-speed gas jets, etc.) may be used to clear the conduit of clogs or deposits. Lasers, scrapers, drills, reamers, borers, or high-speed jets can be used to form the conduit in a solid material.

The method 900 can include venting one or more orifices to a second pressure (BLOCK 920). The second pressure can be equal to the first gas pressure. The outlet of the conduit can be vented (e.g., exposed) to a third gas pressure. The third gas pressure can be the same as the first and second pressure. Venting the one or more orifices, the outlet, and the fluid surface to the same gas pressure (e.g., first gas pressure, etc.) can enable passive pressure coupling between the fluid pressure at the one or more orifices and the gas pressure outside the one or more orifices.

The method 900 can include characterizing the fluid (BLOCK 925). Characterizing the fluid in the conduit can include at least one of measuring a temperature, a flow rate, a density, a viscosity, a chemical composition, an isotopic composition, entrained gases, entrained particles, speciation, spectroscopic signatures, radiation signature, particle content, or particle size distribution. Characterizing the fluid in the conduit can include analyzing, by a detector, a property of the fluid. The detector can include at least one of an alpha particle spectrometer, a gamma ray spectrometer, a neutron spectrometer, a laser induced breakdown spectrometer, an ultraviolet-visible spectrometer (e.g., UV-Vis spectrometer), a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor.

The method 900 can include applying a flow of purge gas to the region around the one or more orifices. A flow of purge gas may be applied to prevent gas or vapor from coming into contact with components of the detector. The method 900 can include controlling the gas pressure at the one or more orifices to manipulate the shape of the gas-liquid interface. The method 900 can include applying potentials across electrodes located within the conduit to perform complementary measurements or to perform electrochemical manipulations of the fluid for techniques such as spectroelectrochemistry.

The method 900 can include adjusting the first cross-sectional area. For example, adjusting the first cross-sectional area can include increasing the first cross-sectional area. Adjusting the first cross-sectional area can include decreasing the first cross-sectional area. Adjusting the first cross-sectional area can occur responsive to a change in the second cross-sectional area. The method 900 can include adjusting the second cross-sectional area. For example, adjusting the second cross-sectional area can include increasing the second cross-sectional area. Adjusting the second cross-sectional area can include decreasing the second cross-sectional area. Adjusting the second cross-sectional area can occur responsive to a change in the first cross-sectional area.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A flow cell system comprising:
   a vessel;
   a fluid located in the vessel;
   a fluid surface of the fluid vented to a first gas pressure, the fluid surface having a first cross-sectional area; and
   a conduit in fluid communication with the vessel and positioned downstream of the vessel, the conduit having a region with a second cross-sectional area and comprising one or more orifices;
   wherein the second cross-sectional area is less than the first cross-sectional areas;

wherein the one or more orifices are vented to a second gas pressure, the second gas pressure is equal to or greater than the first gas pressure;

wherein a first side of the one or more orifices and a first side of a wall of the conduit are exposed to an interior of the conduit;

wherein a second side of the wall of the conduit is exposed to an exterior of the conduit, the second side of the wall of the conduit disposed opposite the first side of the wall of the conduit;

wherein a second side of the one or more orifices is exposed to the exterior of the conduit, the second side of the one or more orifices disposed opposite the first side of the one or more orifices; and wherein the exterior of the conduit is in fluid communication with the interior of the conduit.

2. The flow cell system of claim 1, further comprising a detector configured to characterize the fluid in the conduit.

3. The flow cell system of claim 1, wherein:
the fluid surface of the fluid is located at a first elevation; and
the one or more orifices are located at a second elevation, the second elevation lower than the first elevation.

4. The flow cell system of claim 1, further comprising:
an outlet of the conduit located at a third elevation;
wherein the fluid surface of the fluid is located at a first elevation;
wherein the one or more orifices are located at a second elevation, the second elevation lower than the first elevation; and
wherein the third elevation is lower than or equal to the second elevation.

5. The flow cell system of claim 1, further comprising:
a fluid source in fluid communication with the vessel, the vessel positioned downstream of the fluid source.

6. The flow cell system of claim 1, wherein a fluid from a fluid source is transported to the vessel by at least one of mechanical pumping, fluidic pumping, solid conveyance, vacuum filling, gravity flow, split stream sampling, or pressurization of the fluid source.

7. The flow cell system of claim 1, wherein the one or more orifices comprise:
a first orifice located at a first orifice elevation; and
a second orifice located at a second orifice elevation;
wherein the first orifice elevation is equal to the second orifice elevation.

8. The flow cell system of claim 1, wherein the one or more orifices comprise:
a first orifice oriented in a first direction; and
a second orifice oriented in a second direction;
wherein the first direction opposes the second direction; and
wherein the first direction and the second direction are perpendicular with respect to gravity.

9. The flow cell system of claim 1, further comprising one or more orifice conduits fluidly coupled to the one or more orifices.

10. The flow cell system of claim 1, further comprising:
an orifice inlet; and
an orifice outlet located upstream of the orifice inlet.

11. The flow cell system of claim 1, further comprising:
an outlet of the conduit vented to a third gas pressure, the third gas pressure equal to the first gas pressure.

12. The flow cell system of claim 1, wherein the conduit comprises internal structures configured to mix the fluid.

13. The flow cell system of claim 1, wherein the fluid is at least one of an aqueous fluid, an organic fluid, a molten salt, a molten metal, or a mineral slurry.

14. The flow cell system of claim 1, wherein the conduit is a main conduit, the flow cell system further comprising:
an overflow conduit;
wherein the fluid surface of the fluid is located at a fixed elevation.

15. A method for analyzing a fluid, comprising:
providing a vessel containing a fluid;
venting a fluid surface of the fluid to a first gas pressure, the fluid surface having a first cross-sectional area;
flowing the fluid from the vessel to a conduit positioned downstream from the vessel, the conduit having a region with a second cross-sectional area that is less than the first cross-sectional area and comprising one or more orifices;
venting the one or more orifices to a second gas pressure, the second gas pressure equal to or greater than the first gas pressure; and
characterizing the fluid in the conduit,
wherein a first side of the one or more orifices and a first side of a wall of the conduit are exposed to an interior of the conduit;
wherein a second side of the wall of the conduit is exposed to an exterior of the conduit, the second side of the wall of the conduit disposed opposite the first side of the wall of the conduit;
wherein a second side of the one or more orifices is exposed to the exterior of the conduit, the second side of the one or more orifices disposed opposite the first side of the one or more orifices; and
wherein the exterior of the conduit is in fluid communication with the interior of the conduit.

16. The method of claim 15, wherein characterizing the fluid in the conduit comprises at least one of measuring a temperature, a flow rate, a density, a viscosity, a chemical composition, an isotopic composition, entrained gases, entrained particles, speciation, spectroscopic signatures, radiation signature, particle content, or particle size distribution.

17. The method of claim 15, wherein characterizing the fluid in the conduit comprises:
analyzing, by a detector, a property of the fluid;
wherein the detector is at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor.

18. The method of claim 15, further comprising applying a flow of purge gas to the one or more orifices.

19. The method of claim 15, further comprising adjusting the first cross-sectional area.

20. The method of claim 15, further comprising adjusting the second cross-sectional area.

21. The method of claim 15, wherein the one or more orifices comprise a first orifice and a second orifice, the method further comprising applying a gas pulse to the first orifice to eject a sample of the fluid out of the second orifice.

* * * * *